(12) United States Patent
Yee

(10) Patent No.: US 8,787,308 B2
(45) Date of Patent: Jul. 22, 2014

(54) IMS FEMTOCELL FOR VOICE, DATA AND VIDEO

(75) Inventor: Jung Yee, Ottawa (CA)

(73) Assignee: Wi-Lan, Inc., Ottawa (CA)

( * ) Notice: Subject to any disclaimer, the term of this patent is extended or adjusted under 35 U.S.C. 154(b) by 631 days.

(21) Appl. No.: 12/883,008

(22) Filed: Sep. 15, 2010

(65) Prior Publication Data

US 2012/0063415 A1 Mar. 15, 2012

(51) Int. Cl.
*H04W 4/00* (2009.01)
*H04L 12/66* (2006.01)
*H04J 3/16* (2006.01)

(52) U.S. Cl.
USPC .......................... 370/331; 370/354; 370/466

(58) Field of Classification Search
USPC .......... 370/330, 331, 351, 352, 354, 465, 466
See application file for complete search history.

(56) References Cited

U.S. PATENT DOCUMENTS

| | | | | |
|---|---|---|---|---|
| 8,233,417 B1 * | 7/2012 | Goldner | ...................... | 370/310.2 |
| 2008/0207170 A1 | 8/2008 | Khetawat et al. | | |
| 2009/0067417 A1 | 3/2009 | Kalavade et al. | | |
| 2009/0129263 A1 * | 5/2009 | Osborn | ......................... | 370/230 |
| 2009/0291690 A1 * | 11/2009 | Guvenc et al. | ................ | 455/444 |
| 2010/0067493 A1 * | 3/2010 | Mahdi | .......................... | 370/332 |
| 2011/0053609 A1 * | 3/2011 | Choi-Grogan | ............. | 455/456.2 |

FOREIGN PATENT DOCUMENTS

WO 2006024887 A1 9/2006

OTHER PUBLICATIONS

International Search Report and Written Opinion issued on Jan. 24, 2012, in corresponding application No. PCT/CA2011/050536, 11 pages.

* cited by examiner

*Primary Examiner* — Chirag Shah
*Assistant Examiner* — Jenkey Van
(74) *Attorney, Agent, or Firm* — Procopio, Cory, Hargreaves & Savitch LLP

(57) ABSTRACT

An Internet Protocol Multimedia System (IMS) femtocell serves as a base station and base station controller in a wireless/wireline service provider's macro network and a Wi-Fi access point to seamlessly support cellular and packet user devices and deliver both circuit switched and packet switched services inside a building.

18 Claims, 4 Drawing Sheets

IMS FEMTOCELL FOR VOICE, DATA AND VIDEO

FIELD OF THE INVENTION

This invention relates in general to mobile communications and, in particular, to the extension of mobile communications into indoor environments.

BACKGROUND OF THE INVENTION

Macro-cellular network mobile service providers have difficulty delivering mobile communications services inside buildings, where radio signals are attenuated by walls and other obstructions. Radio signal attenuation increases proportionally with the radio signal frequency. For high frequency spectrum bands such as 3G and WiMAX, the signal attenuation results in severe degradation of service quality.

Femtocells were conceived as small, low power radio systems (e.g. 3G, WiMAX) that plug into a residential broadband connection to provide a low power mobile signal within a building. It has been recognized for some time that femtocells can provide a viable mechanism for extending the service range of mobile service providers.

Consequently, many femtocell architectures have been conceived, including femtocells that use an internet protocol (IP) connection for backhaul. For example, 3rd Generation Partnership Project (3GPP) Technical Specification Group Services and System Aspects, specify in "3GPP TR 23.832 V10.0.0 (2010-03)" IP Multimedia Subsystem (IMS) aspects of an architecture for Home Node B (HNB), which enables an IMS femtocell to seamlessly handoff 3GPP cellular voice/data call sessions. WiMax Gateways that provide VoIP, Ethernet and Wi-Fi connectivity are also available from Intel® and other manufactures.

It is known that consumers are interested in service plan simplicity and single-source service provision. Their interest has created an opportunity for wireless service providers to broaden their service offerings and extend their network coverage into within-building environments. Current options for macro-cellular service extension include known IMS femtocells. However, the known IMS femtocells require expensive hardware/software enhancements to the macro-service provider network. A need therefore exists for an IMS femtocell that supports voice, data and video sessions, and seamlessly integrates into a mobile service provider's existing IMS network.

SUMMARY OF THE INVENTION

It is therefore an object of the invention to provide an IMS femtocell that supports voice, data and video sessions, and seamlessly integrates into a mobile service provider's existing IMS network.

The invention therefore provides an Internet Protocol Multimedia System (IMS) femtocell, comprising: a wireless session controller that serves as a micro-base station and supports circuit switched domain communications initiated by or addressed to user devices attached to the IMS femtocell; a Wi-Fi access point that supports packet service communication sessions initiated by or addressed to user devices attached to the IMS femtocell; a Session Initiation Protocol (SIP) agent that serves as a base station controller in a wireless network provider macro network, and as an IMS service endpoint in an IMS network to which the IMS femtocell is connected; an authentication, authorization and accounting (AAA) agent that provides AAA services to the IMS femtocell and user devices that request attachment to the IMS femtocell; and a backhaul interface that supports a connection to a backhaul network.

The invention further provides an Internet Protocol Multimedia System (IMS) femtocell, comprising: a wireless session controller that supports circuit switched service communications initiated by or addressed to user devices attached to the IMS femtocell; a Wi-Fi access point that supports packet service communication sessions initiated by or addressed to user devices attached to the IMS femtocell; a Session Initiation Protocol (SIP) agent that serves as an IMS service endpoint in an IMS network to which the IMS femtocell is connected; an authentication, authorization and accounting (AAA) agent; and a backhaul interface that supports a connection to a backhaul network that provides data backhaul to the IMS femtocell.

The invention yet further provides an Internet Protocol Multimedia System (IMS) femtocell, comprising: a wireless session controller that serves as a micro-base station to support circuit switched domain communications initiated by or addressed to user devices attached to the IMS femtocell; a Wi-Fi access point that supports packet service communication sessions initiated by or addressed to user devices attached to the IMS femtocell; a Session Initiation Protocol (SIP) agent that serves as a base station controller in a wireless network provider macro network, and as an IMS service endpoint in an IMS network to which the IMS femtocell is connected; an authentication, authorization and accounting (AAA) agent; a backhaul interface that supports a connection to a backhaul network; a spectrum sensor and spectrum use manager; and a call continuity agent for coordinating call handoff between the wireless session controller and the Wi-Fi access point.

BRIEF DESCRIPTION OF THE DRAWINGS

The invention will now be described by way of example only and with reference to the following drawings, in which.

DETAILED DESCRIPTION OF THE PREFERRED EMBODIMENTS

The invention provides an IMS femtocell with full IMS capability that supports uniform access to multimedia and voice applications by diverse wireless terminals, such as General Packet Radio Service (GPRS), Wireless Local Area Network (WLAN), Code Division Multiple Access (CDMA2000), Wideband Code Division Multiple Access (WCDMA), Worldwide Interoperability for Microwave Access (WiMAX) and 3GPP Long Term Evolution (LTE). The IMS femtocell supports true service convergence, enabling consistent service delivery across all types of access networks and user devices. The IMS femtocell utilizes standard protocols such as Session Initiation Protocol (SIP), and, an Authentication, Authorization and Accounting (AAA) protocol such as Diameter for session control and layer communications, permitting the IMS femtocell to support new applications and services. Authentication is consistent across all user interfaces, obviating any reliance on a particular user interface protocol. A spectrum manager is integrated into the IMS femtocell to provide intelligent switching of data independently of a status of network and user interfaces. A wireless controller of the IMS femtocell supports both circuit switched (CS) and IMS call sessions. A SIP agent of the IMS femtocell provides a CS-to-IMS interworking function and serves as an IMS service endpoint in a service providers IMS network. A call continuity agent provides a media gateway function for the IMS femtocell, and coordinates handoff between the wireless controller and a Wi-Fi access point of the IMS femtocell. All voice and data flows are passed through the call continuity agent. All signal flows go through the SIP agent. The service provider IMS network sees a stable connection to the IMS femtocell, while the call continuity agent is free to switch between cellular and Wi-Fi operation on to fit user/environmental specifications and/or requirements.

Figure 1:
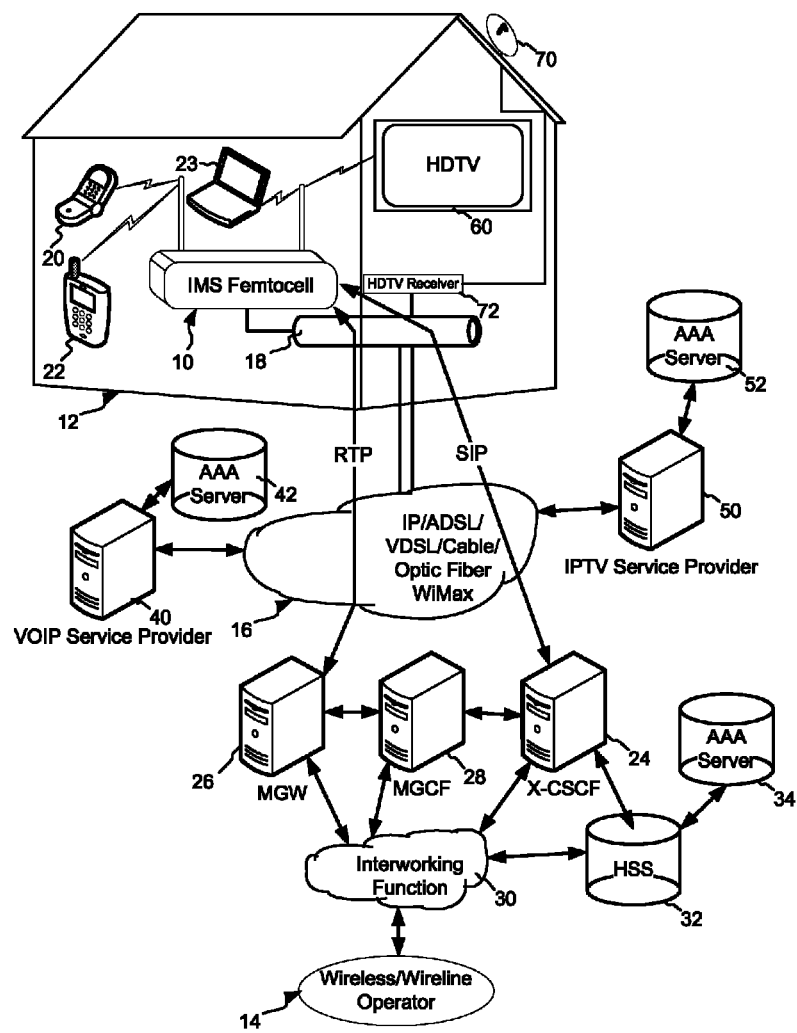
FIG. 1 is a schematic diagram of an operating environment for the IMS femtocell in accordance with the invention

FIG. 1 is a schematic diagram of an operating environment for the IMS femtocell 10 in accordance with the invention, the components of which will be explained below in detail with reference to FIG. 2. The IMS femtocell 10 is located within a building 12, which may be a home, office, or any other enclosed space that cannot be effectively serviced by a wireless/wireline service provider's macro service network 14. In this embodiment, the IMS femtocell 10 is connected to an Internet Protocol (IP) network 16 via an Ethernet backbone 18, though any other suitable connection can be used. The IP network transport may be, for example, any one of Asymmetric Digital Subscriber Line (ADSL); Very High Bitrate Digital Subscriber Line (VDSL); cable modem; optical fiber; WiMax; or, any other suitable IP transport.

The IMS femtocell 10 is a registered component of the macro network 14 and functions within the macro network 14 as a cellular base station and base station controller associated with a Mobile Switching Center (MSC). The IMS femtocell 10 also functions as an IMS service endpoint in the macro network 14. The IMS femtocell 10 is capable of serving cellular telephones 20, smart telephones 22, and other wireless devices to perform CS voice call or data session initiation and handoff to/from the macro network 14 using IMS protocols and procedures for CS/PS session control and authentication, authorization and accounting (AAA) that are known in the art. The IMS femtocell 10 is seen in the macro network 14 as a stable endpoint, but the IMS femtocell 10 may switch between cellular and Wi-Fi operation to dynamically adapt to user/environmental requirements and/or specifications.

All session control signaling between the IMS femtocell 10 and the macro network 14 is performed using SIP signaling communicated to/from a Call Session Control Function (X-CSCF) 24 in the wireless/wireline service provider's IMS network. CS domain call data is communicated between the IMS femtocell 10 and a Media Gateway (MGW) 26 using, for example, Real Time Protocol (RTP). The MGW 26 is controlled by a Media Gateway Controller Function (MGCF) 28 in a manner well known in the art. The x-CSCF 24, MGW 26 and MGCF 28 communicate with control functions in the macro network 14 via an interworking function 30 that performs all necessary protocol translations and media conversions, also using procedures and protocols that are known in the art.

A Voice-over-internet-protocol (VoIP) service provider 40 may, under service provision agreement authorized by the wireless/wireline operator 14, provide VoIP service via the IMS femtocell 10 to any IP device that may be wirelessly connected to the IMS femtocell 10, including personal/tablet computers 23. The VoIP service provider 40 maintains an AAA server 42, which provides direct authentication, authorization and accounting services to the IMS femtocell 10 and user devices connected thereto using protocols and procedures that are known in the art.

Likewise, an IPTV service provider 50 may, under service provision agreement authorized by the wireless/wireline operator 14, provide Internet Protocol Television (IPTV) service via the IMS femtocell 10. The IPTV service provider 40 maintains an AAA server 52 that provides direct authentication, authorization and accounting services to the IMS femtocell 10 and user devices connected to it. The IPTV transmissions are wirelessly routed to HDTV receivers 60, personal/tablet computers 23, smart phones 22, or the like, in a manner known in the art. HDTV signals acquired via satellite using a dish receiver 70 may also be routed via an HDTV receiver 72 through the Ethernet backbone 18 to the IMS femtocell 10. The HDTV signals are then broadcast within the building 12 to the HDTV receiver(s) 60, personal/tablet computer(s) 23, smart phones 22, or the like, in a manner known in the art.

Figure 2:
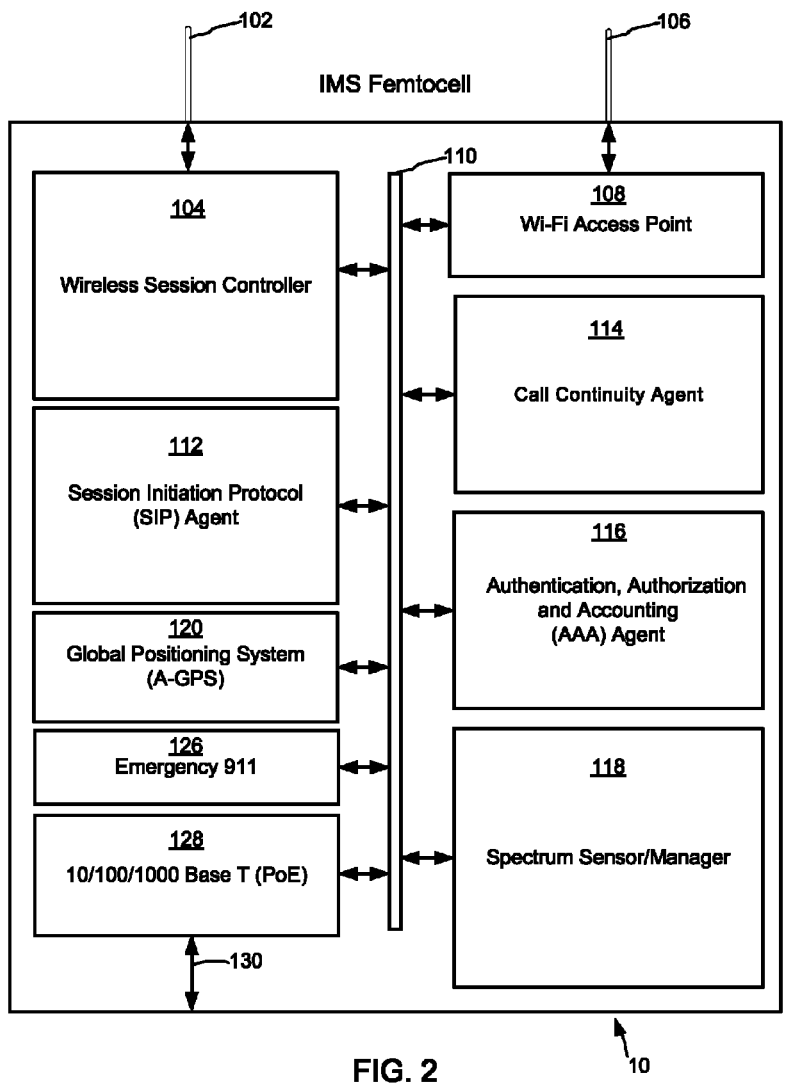
FIG. 2 is a block diagram illustrating functional components of the IMS femtocell in accordance with the invention.

FIG. 2 is a block diagram illustrating functional components of the IMS femtocell 10 in accordance with the invention. The IMS femtocell 10 has at least one send/receive antenna 102 controlled by a wireless session controller 104 for circuit switched (CS) domain communications. As understood by those skilled in the art, the send and receive antennas 102 may be separate antennas. The IMS femtocell also has at least one send/receive antenna controlled by a Wi-Fi access point 108 for packet switched (PS) domain communications. As understood by those skilled in the art, the send and receive antennas 106 may also be separate antennas.

The wireless session controller 104 serves as a micro-base station and supports the CS domain communications initiated by or routed to user devices served by the IMS femtocell as well as IMS call flows. The wireless session controller 104 receives CS domain/PS domain call initiation request data from user devices, such as user devices 20, 22, 23 and passes that data via IMS femtocell backplane 110 to a Session Initiation Protocol (SIP) agent 112. The IMS femtocell 10 supports at least one instance of the SIP agent 112. The SIP agent 112 provides a CS-to-IMS interworking function, and is seen as a stable IMS service endpoint by other entities connected to the IP network 16. The x-CSCF 24, the MGW 26 and the MGCF 28 respectively see the SIP agent 112 as a base station controller in the wireless service provider network. A call continuity agent 114 provides a media gateway function and autonomously controls cellular/VoIP communications and coordinates session handoff between the wireless session controller 104 or the Wi-Fi access point 108, depending on any one or more of:
  a capability of the user device 20, 22 to which an inbound call is directed;
  a user policy or a network service policy; and
  an instruction from a spectrum sensor and spectrum use manager 118, which continuously monitors spectrum use and controls the broadcast frequencies used by the IMS femtocell 10 to maximize quality of service (QoS), while avoiding the broadcast of frequencies that could potentially interfere with macro-network transmissions and/or transmissions of other wireless service providers operating in an area in which the IMS femtocell 10 provides its service.

The Wi-Fi access point 108 supports communication sessions initiated by or routed to IP-enabled user devices, for example user devices 22, 23 and 60 served by the IMS femtocell 10, under the direction and control of the wireless session controller 104 and the call continuity agent 114 using protocols and procedures that are known in the art.

The SIP agent 112 receives all session outbound/inbound communications/service delivery session initiation requests and interworks with the wireless session controller 104, the call continuity agent 114 and the spectrum sensor and spectrum use manager 118 to establish and manage each communications/service delivery session.

With respect to CS domain communications sessions, the SIP agent 112:

performs IMS registration upon CS Attach;
interworks CS session/service control with IMS session/service control, which involves protocol interworking between TS 24.008 Call Control (from/towards the user devices 20, 22) and 3GPP SIP (from/toward the service provider IMS);
interworks CS user plane data with packet media over the IP network 16, which involves protocol conversion between the CS domain radio interface data frames and RTP packets;
initiates handover, as required, from the IMS femtocell 10 to the macro network 14; and
controls handover, as required, from the macro network 14 to the IMS femtocell 10, including coordination with the wireless session controller 104, the call continuity agent 114 and the spectrum sensor and spectrum use manager 118 to select the mode (CS or PS) and the channel/frequency over which the IMS femtocell 10 will support the handed-over communications session.

An authentication, authorization and accounting (AAA) agent 116 provides AAA services to the IMS femtocell 10 and user devices 20, 22, 60 that attach to the IMS femtocell 10. The AAA agent 116 is, for example, a Diameter agent known in art, which operates using protocols and procedures that are also well known in the art.

The IMS femtocell 10 further includes an assisted global positioning system (A-GPS) 120 for determining location coordinates of the femtocell 10 within 300 meters for the purpose compliance with of Enhanced 911, phase 2. The A-GPS 120 provides location coordinates information to an Emergency 911 module 126, which also stores address information, if available, and supplies the location coordinate and address information to an Emergency 911 system in an event that any device connected to the IMS femtocell 10 launches an E911 call in either of the CS or PS domains.

As explained above, the IMS femtocell 10 is equipped with an Ethernet interface 128, which supports the connection to the IP network 14 and, if desired, a user Ethernet network. The Ethernet interface 128 is used for the backhaul of CS domain and PS domain communications traffic in a manner well known in the art. In one embodiment the Ethernet interface 128 also supports power over Ethernet (PoE) to power the IMS femtocell 10, thus eliminating a requirement for a power connection to supply the IMS femtocell 10 with operating power.

As also explained above, the IMS femtocell 10 is equipped with a spectrum sensor and a spectrum use manager 118. The spectrum sensor senses spectrum usage. In one embodiment, the spectrum sensor operates as described in Assignee's co-pending patent application Ser. No. 12/543,259 filed Aug. 18, 2009, the specification of which is incorporated herein in its entirety. Using spectrum usage information, white space availability information and connected device capability information, the spectrum sensor and spectrum use manager 118 controls CS domain channel usage and PS domain frequency usage with a goal of operating within unused spectrum to minimize interference with neighboring micro and macro networks.

Figure 3:
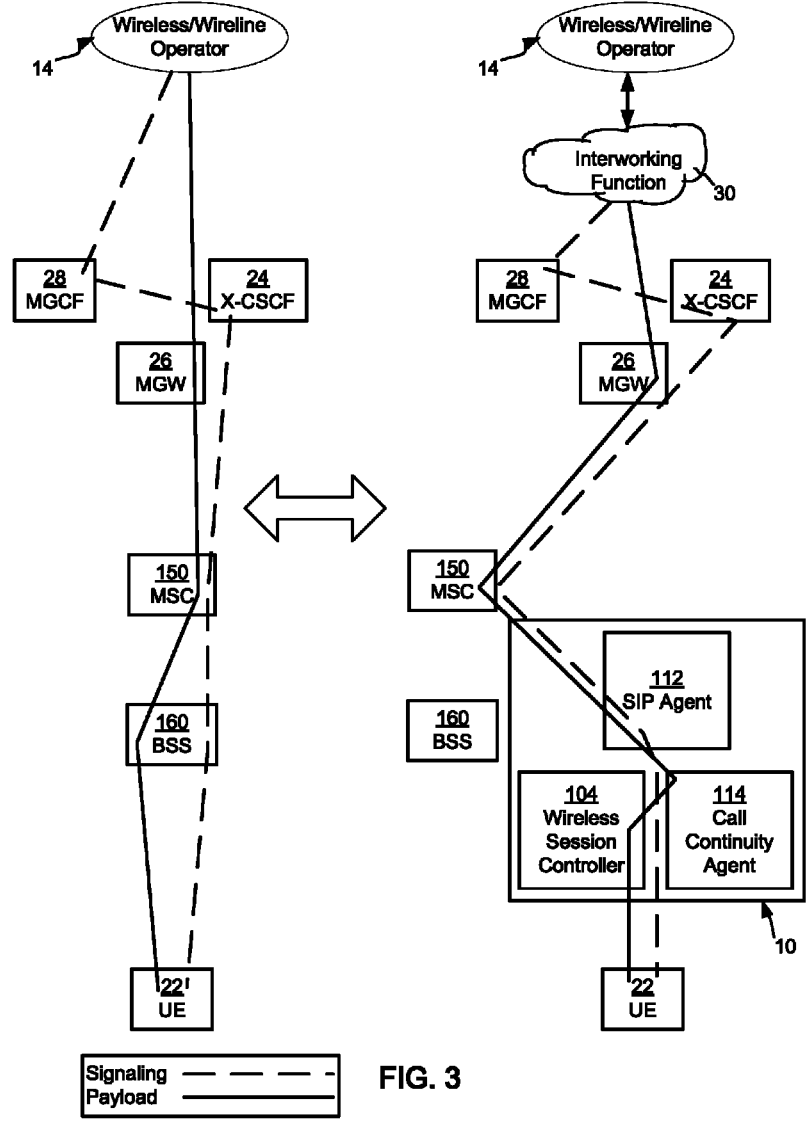
FIG. 3 illustrates one method of call handling when a CS domain call is handed off to the IMS femtocell in accordance with the invention.

By way of example, FIG. 3 illustrates a method of call handling when a CS domain call is handed over to the IMS femtocell 10.

1. UE 22 establishes a call over CS network via BSS 160 and MSC 150;
2. Handover request initiation:
  1. UE 22 detects a stronger signal from the IMS femtocell 10 and sends radio measurement data to the MSC 150, and
  2. provides SIP Agent 112 as target BSS;
3. Handover request processing:
  1. MSC 150 sends a handover request to SIP Agent 112
  2. The SIP Agent 112 returns the handover setup message to MSC with a handover number;
4. Handover establishment:
  1. MSC 150 sends the radio channel of the IMS femtocell 10 to the UE 22 via the BSS 160;
  2. UE 22 establishes a call with the IMS femtocell 10;
6. Handover completion
  1. The SIP Agent 112 sends handover complete message to MSC 150;
7. Call is established and remains anchored at the MSC.

Figure 4:
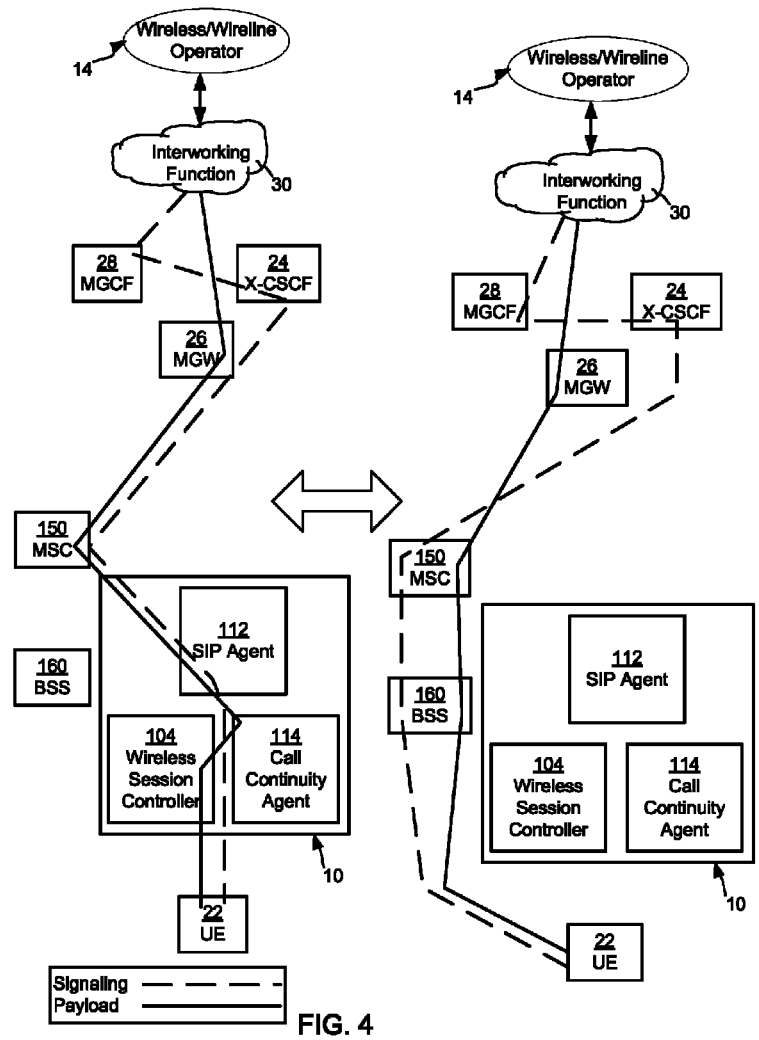
FIG. 4 illustrates one method of call handling when an IMS femtocell call is handed off to the CS domain.

FIG. 4 illustrates a method of call handling when a call established from/to the IMS femtocell 10 is handed over to the CS domain.

UE 22 establishes a call via IMS femtocell 10 and MSC 150;
2. Handover request initiation:
  1. UE 22 detects a stronger signal from the BSS 160 and sends radio measurement data to the MSC 150, and
  2. provides BSS 160 as target BSS;
3. Handover request processing:
  1. MSC 150 sends a handover request to BSS 160;
  2. The BSS 160 returns the handover setup message to MSC with a handover number;
4. Handover establishment:
  1. MSC 150 sends the radio channel of the BSS 160 to the UE 22 via the IMS femtocell 10;
  2. UE 22 establishes a call with the BSS 160;
6. Handover completion
  1. The BSS 160 sends handover complete message to MSC 150;
7. Call is established and remains anchored at the MSC.

The signaling messages associated with these call handovers are known in the art and described for example in 3GPP TR 23.832 V10.0.0.

It should be noted that the embodiments of the invention described above are intended to be exemplary only. The scope of the invention is therefore intended to be limited solely by the scope of the appended claims.

I claim:

1. An internet protocol multimedia system femtocell, comprising:
  a wireless session controller that serves as a micro-base station and supports circuit switched domain and internet protocol multimedia system communication sessions initiated by or addressed to user devices attached to the internet protocol multimedia system femtocell;
  a Wi-Fi access point that cooperates with the wireless session controller to support packet switched communication sessions to/from user devices attached to the internet protocol multimedia system femtocell;
  a spectrum sensor and spectrum manager that monitors spectrum usage in a location of the internet protocol multimedia system femtocell and transmits instructions to control spectrum usage by the internet protocol multimedia system femtocell to reduce a probability of interference with other service transmissions;

a call continuity agent that provides a media gateway function and coordinates session handoff between the wireless session controller and the Wi-Fi access point based at least in part on instructions received from the spectrum sensor and spectrum manager;

a session initiation protocol agent that provides a circuit switched-to-internet protocol multimedia system interworking function and serves as an internet protocol multimedia system service endpoint in an internet protocol multimedia system network to which the internet protocol multimedia system femtocell is connected;

an authentication, authorization and accounting agent that provides authorization and accounting services to the internet protocol multimedia system femtocell and user devices that request attachment to the internet protocol multimedia system femtocell; and a backhaul interface that supports a connection to a backhaul network.

2. The internet protocol multimedia system femtocell as claimed in claim 1 further comprising a global positioning system that determines geographical location coordinates of the internet protocol multimedia system femtocell.

3. The internet protocol multimedia system femtocell as claimed in claim 2 wherein the global positioning system is an assisted global positioning system.

4. The internet protocol multimedia system femtocell as claimed in claim 2 further comprising an emergency 911 system for providing the geographical coordinates to an emergency 911 system in response to an emergency 911 call launched by a user device attached to the internet protocol multimedia system femtocell.

5. The internet protocol multimedia system femtocell as claimed in claim 1 wherein the backhaul interface is an Ethernet interface that supports a connection to an Ethernet backbone.

6. The internet protocol multimedia system femtocell as claimed in claim 5, wherein the Ethernet interface supports power over Ethernet to provide operating power the internet protocol multimedia system femtocell.

7. The internet protocol multimedia system femtocell as claimed in claim 1 wherein all circuit switched and packet switched call flows initiated by or addressed to user devices attached to the internet protocol multimedia system femtocell pass through the call continuity agent.

8. An internet protocol multimedia system femtocell, comprising:

a wireless session controller that supports circuit switched domain communication sessions and internet protocol multimedia system communication sessions initiated by or addressed to user devices attached to the internet protocol multimedia system femtocell;

a Wi-Fi access point that cooperates with the wireless session controller to support packet switched communication sessions to/from user devices attached to the internet protocol multimedia system femtocell;

a spectrum sensor and spectrum manager that monitors spectrum usage and generates instructions to control spectrum usage by the wireless session controller and the Wi-Fi access point to reduce a probability of interference with other sensed service transmissions;

a call continuity agent that provides a media gateway function and coordinates session handoff between the wireless session controller and the Wi-Fi access point based at least in part on instructions received from the spectrum sensor and spectrum manager;

a session initiation protocol agent that provides a circuit switched-to-internet protocol multimedia system interworking function and serves as an internet protocol multimedia system service endpoint in an internet protocol multimedia system network to which the internet protocol multimedia system femtocell is connected;

an authentication, authorization and accounting agent; and a backhaul interface that supports a connection to a backhaul network that provides data backhaul to the internet protocol multimedia system femtocell.

9. The internet protocol multimedia system femtocell as claimed in claim 8 wherein the wireless session controller serves as a micro base station associated with a mobile switching center in a wireless service provider network.

10. The internet protocol multimedia system femtocell as claimed in claim 9 wherein the session initiation protocol agent further serves as a base station controller in the wireless service provider network.

11. The internet protocol multimedia system femtocell as claimed in claim 8 further comprising a global positioning system that determines geographical location coordinates of the internet protocol multimedia system femtocell.

12. The internet protocol multimedia system femtocell as claimed in claim 11 wherein the global positioning system is an assisted global positioning system.

13. The internet protocol multimedia system femtocell as claimed in claim 11 further comprising an emergency 911 system that provides emergency response information to a emergency 911 system when an emergency 911 call is launched by a user device attached to the internet protocol multimedia system femtocell.

14. The internet protocol multimedia system femtocell as claimed in claim 8 wherein the backhaul interface comprises an Ethernet interface that supports a connection to an Ethernet backbone.

15. The internet protocol multimedia system femtocell as claimed in claim 14, wherein the Ethernet interface supports power over Ethernet to provide operating power the internet protocol multimedia system femtocell.

16. The internet protocol multimedia system femtocell as claimed in claim 8 wherein all circuit switched domain and power switched domain call data flows through the call continuity agent.

17. An internet protocol multimedia system femtocell, comprising:

a wireless session controller that supports circuit switched domain communications and packet switched domain communications initiated by or addressed to user devices attached to the internet protocol multimedia system femtocell;

a Wi-Fi access point that cooperates with the wireless session controller to support packet switched communication sessions to/from user devices attached to the internet protocol multimedia system femtocell;

a spectrum sensor and spectrum manager that monitors spectrum usage in a location of the internet protocol multimedia system femtocell and transmits instructions to control spectrum usage by the internet protocol multimedia system femtocell to reduce a probability of interference with other service transmissions;

a call continuity agent provides a media gateway function and coordinates handoff between the wireless controller and the Wi-Fi access point based upon, at least in part, instructions from the spectrum sensor and spectrum manager, all voice and data flows passing through the call continuity agent;

a session initiation protocol agent provides a circuit switched-to-internet protocol multimedia system interworking function and serves as an internet protocol multimedia system service endpoint in an internet protocol multimedia system network to which the internet protocol multimedia system femtocell is connected;

an authentication, authorization and accounting agent;

a backhaul interface that supports a connection to a backhaul network.

18. The internet protocol multimedia system femtocell as claimed in claim 17 further comprising a global positioning system that determines geographical location coordinates of the internet protocol multimedia system femtocell.

\* \* \* \* \*